United States Patent
Raghavendran et al.

(10) Patent No.: US 11,436,127 B1
(45) Date of Patent: Sep. 6, 2022

(54) AUTOMATED VALIDATION AND AUTHENTICATION OF SOFTWARE MODULES

(71) Applicant: Cisco Technology, Inc., San Jose, CA (US)

(72) Inventors: Vijayakumar Raghavendran, Fremont, CA (US); Chockalingam Ramiah, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/016,918

(22) Filed: Sep. 10, 2020

(51) Int. Cl.
*G06F 9/44* (2018.01)
*G06F 11/36* (2006.01)

(52) U.S. Cl.
CPC ........ *G06F 11/368* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| 10,069,694 | B1* | 9/2018 | Schwartz | H04L 41/0893 |
| 2006/0075219 | A1* | 4/2006 | Callaghan | H04L 63/0823 |
| | | | | 713/156 |
| 2008/0295064 | A1* | 11/2008 | Mitra | G06F 11/3664 |
| | | | | 717/100 |
| 2014/0259004 | A1* | 9/2014 | Devarajan | G06F 21/572 |
| | | | | 717/173 |
| 2015/0365412 | A1 | 12/2015 | Innes et al. | |
| 2017/0012968 | A1* | 1/2017 | Feng | G06F 8/63 |
| 2017/0054710 | A1* | 2/2017 | Xiong | G06F 9/45558 |
| 2018/0227182 | A1 | 8/2018 | Patton et al. | |
| 2019/0052548 | A1 | 2/2019 | Kojukhov et al. | |
| 2019/0104047 | A1* | 4/2019 | Tejaprakash | H04L 41/22 |
| 2020/0028868 | A1 | 1/2020 | Sood et al. | |

OTHER PUBLICATIONS

Cisco, "Cisco Enterprise Network Function Virtualization Infrastructure Software Configuration Guide, Release 3.12.x", Feb. 19, 2020, 27 pages.

(Continued)

*Primary Examiner* — Wei Y Zhen
*Assistant Examiner* — Lanny N Ung
(74) *Attorney, Agent, or Firm* — Edell, Shapiro & Finnan, LLC

(57) ABSTRACT

A consumer of a software module issues a module certificate that enables a testing entity to automatically validate a software module from a producer of the software module. The consumer receives a request for a module certificate from the producer of the software module. The request indicates attributes of the software module. The consumer determines whether the attributes of the software module are within predetermined limits, and if the attributes are within predetermined limits, the consumer generates and signs the module certificate including the attributes of the software module. The consumer issues the module certificate to the producer of the software module. Once the consumer obtains a software package including the software module and the module certificate from the producer, the consumer directs a testing entity to validate the software module with the module certificate.

20 Claims, 7 Drawing Sheets

(56) References Cited

OTHER PUBLICATIONS

Ericsson, "VNF Partner Certification", 2 pages, retrieved from Internet Sep. 10, 2020; https://www.ericsson.com/en/digital-services/offerings/nfvi-cloud-infrastructure/nfv-infrastructure/vnf-certification-service.

RedHat, "Red Hat OpenStack Certification 1.0 Red Hat OpenStack Application and VNF Policy Guide", last updated May 6, 2020, 14 pages.

* cited by examiner

AUTOMATED VALIDATION AND AUTHENTICATION OF SOFTWARE MODULES

TECHNICAL FIELD

The present disclosure relates to automated testing for the acceptance of software modules, particularly for solution integration from multiple software vendors in a multi-cloud environment in an agile deployment model.

BACKGROUND

Validation of software modules allows for the consumers of software modules to verify that the software modules, such as various release versions of an existing code base, are less likely to hamper the operation of existing products. For instance, a software producer may release various versions of a software module to the consumer for validation and testing. The consumer may authorize a tester to validate the software module according to different criteria (e.g., security compliance, quality, supported features, version compatibility, etc.) based on various artifacts submitted by the producer. In a manual validation process, any failure resulting from not meeting the predefined criteria may require a detailed report for the producer to mitigate such failures.

Manually validating one criteria from the consumer, providing a report to the producer, and receiving an updated software module from the producer to continue the validation typically requires at least one day for each criteria, and may be subject to human errors in processing. Additionally, the artifacts submitted by the producer may be duplicates or outdated, requiring the tester to request accurate supporting material. As the number of criteria to validate for a software module increases, the turnaround time for validating all of the criteria increases to unacceptable levels in an agile development model.

DESCRIPTION OF EXAMPLE EMBODIMENTS

Overview

A computer implemented method is provided to issue a module certificate that enables a testing entity to automatically validate a software module from a producer. The method includes receiving at a consumer of the software module, a request for a module certificate from the producer of the software module. The request indicates attributes of the software module. The method also includes determining whether the attributes of the software module are within predetermined limits. If the attributes are within predetermined limits, the method includes generating the module certificate signed by the consumer of the software module. The module certificate includes the attributes of the software module. The method further includes issuing the module certificate to the producer of the software module. The method also includes obtaining a software package of the software module and the module certificate from the producer, and may include directing a testing entity to validate the software module with the module certificate.

Example Embodiments

In a software development system, producers of software modules may produce multiple releases of software code modules to a consumer of the software modules for solution testing in an agile development model. The consumer may designate a tester to validate the software module releases for further testing (e.g., integration testing) based on various criteria, including security compliance, quality, supported features, and version compatibility. Manually validating each release of a software module before accepting the software module for testing is error prone and high risk in terms of time and resource consumption.

As a specific example, the techniques for automatically validating software code modules may be applied to a 5G deployment with producers of Virtual Network Function (VNFs) and/or Cloud Native/Network Functions (CNFs) providing releases to a consumer, such as a 5G service provider. However, the techniques described herein may be useful in any type of software development environment. In the techniques described herein, the consumer provides a structure of attributes for the software module in a digital certificate issued by the consumer to the producer. The producer provides the software module (e.g., a CNF/VNF release) packaged with the digital certificate to the consumer. The consumer may direct a testing entity (e.g., an independent third party tester) to validate the software module with the digital certificate before expending resources on automated testing in the consumer's environment.

Figure 1:
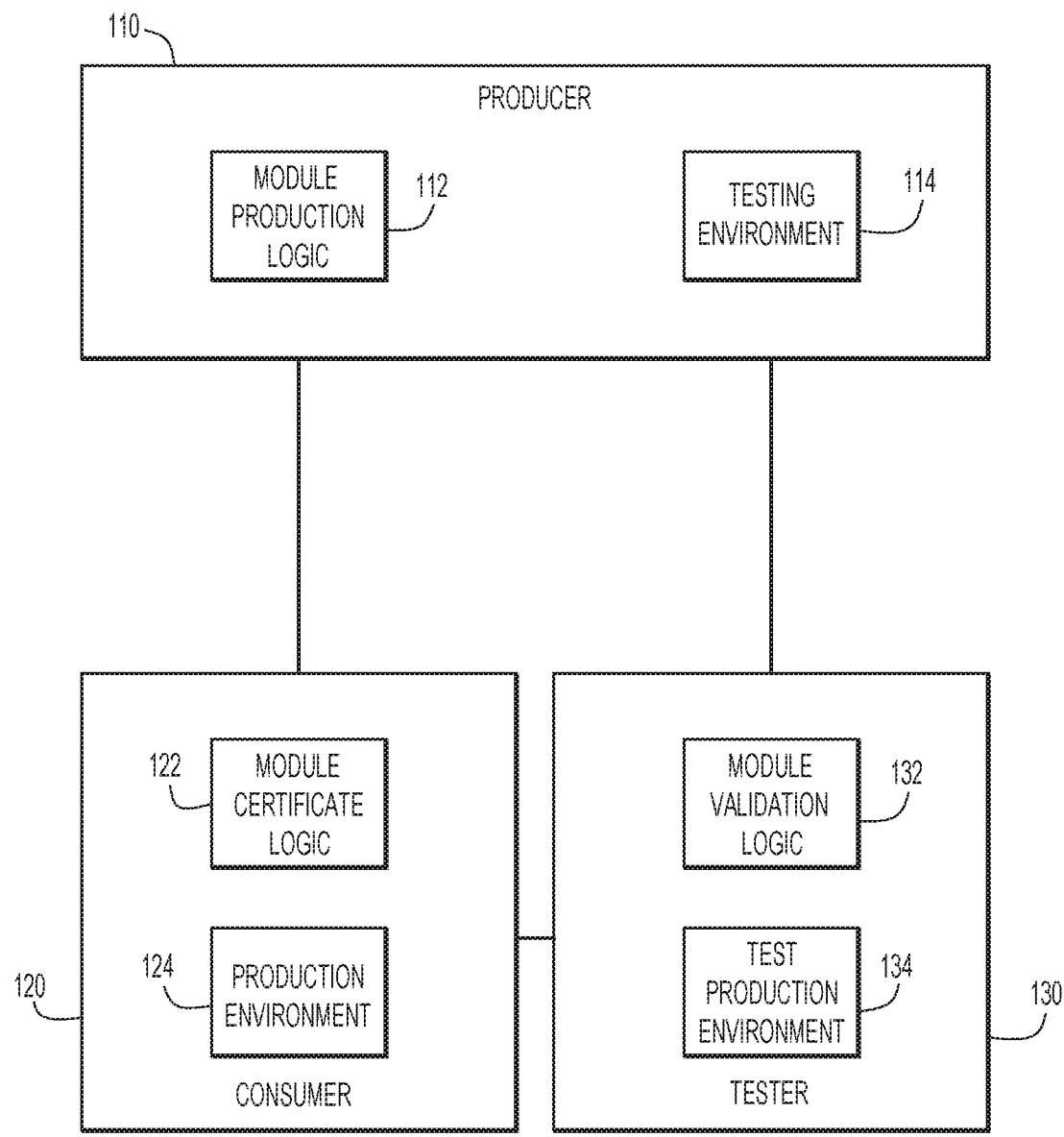
FIG. 1 is a simplified block diagram of an automatic software module validation system, according to an example embodiment.

Referring now to FIG. 1, a simplified block diagram illustrates a software validation system 100 between a producer 110, a consumer 120, and a tester 130. The producer 110 includes module production logic 112 configured to generate and test software modules, such as components of CNF/VNF products. The producer 110 also includes a testing environment 114 that is configured to test the software modules in one or more computing environments.

The consumer 120 of the software module includes a module certificate logic 122 that is configured to issue a digital certificate to the producer 110. The consumer 120 also includes a production environment 124 in which the software module will be integrated after being validated and tested. The tester 130 includes module validation logic 132 configured to validate a software module provided by the producer 110 using the digital certificate issued by the consumer 120 to the producer 110. The tester 130 may also include a test production environment 134 to perform automated testing on software modules that are successfully validated. In one example, the tester 130 may be run by the consumer 120 as an internal testing entity. Alternatively, the tester 130 may be an independent third party that the consumer 120 grants privileges and responsibility to validate software modules.

In one example, the producer 110, consumer 120, and tester 130 may include one or more computing devices that are configured to implement the techniques described herein. The one or more computing devices may be connected by one or more computing networks (e.g., Local Area Network (LAN), Wide Area Network (WAN), intranet, internet, wired, wireless, etc.). Additionally, the computing devices at each entity, i.e., the producer 110, consumer 120, and tester 130, may communicate with the computing devices at the other entities by one or more computer networks.

Figure 2:
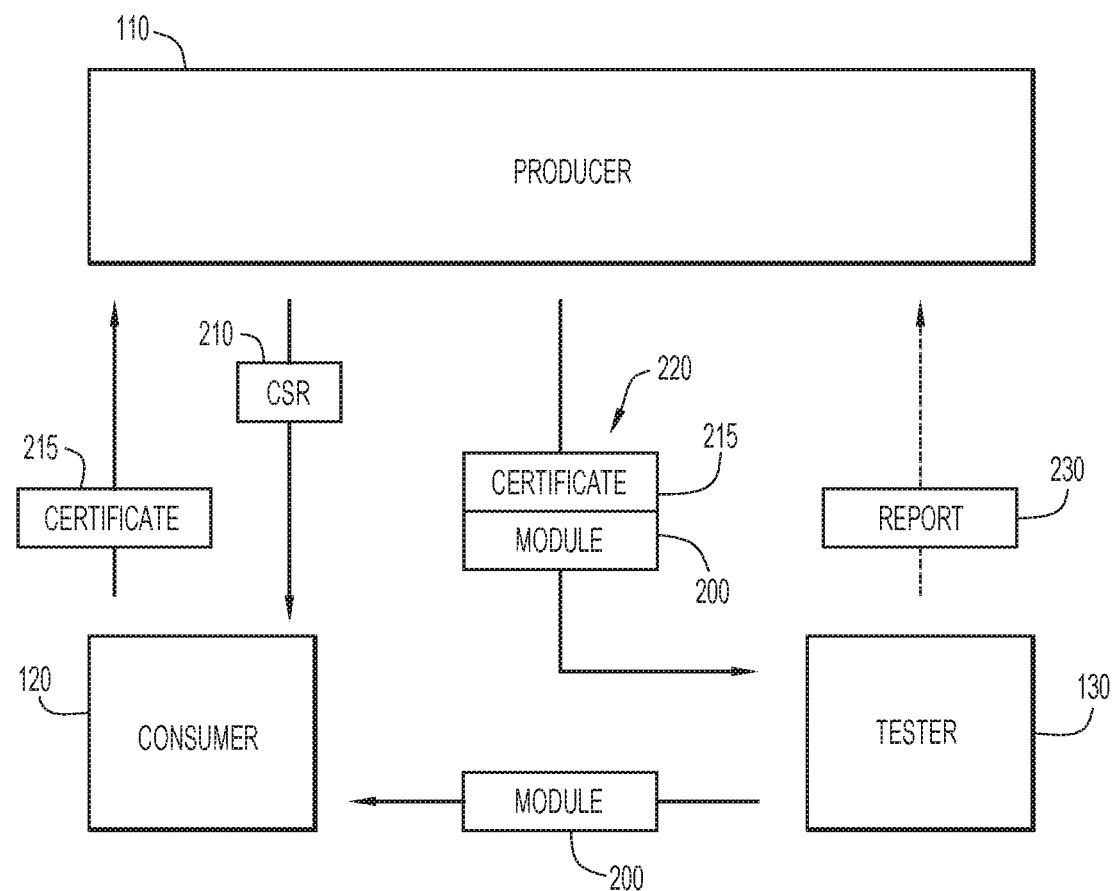
FIG. 2 is a simplified block diagram illustrating messages passed in automatically validating a software module, according to an example embodiment.

Referring now to FIG. 2, a simplified diagram illustrates messages passed between the producer 110, consumer 120, and tester 130 in one example of validating a code module 200. After the producer 110 has written and tested the code module 200 and is ready to provide the software module 200 to the consumer 120, the producer 110 sends a Certificate Signing Request (CSR) 210 to the consumer 120. In one example, the CSR 210 requests a certificate that includes various attributes of the code module 200. If the attributes in the CSR 210 are acceptable to the consumer 120, the consumer 120 issues a certificate 215 to the producer 110 in response to the CSR 210. The certificate 215 includes custom fields with attributes characterizing the code module 200, such as the type of code module, a quality metric, a security benchmark, a test environment, a release date, and/or other attribute describing the code module 200.

Once the producer 110 receives the certificate 215, the producer groups the code module 200 with the certificate 215 into a package 220, and sends the package 220 to be verified. The producer 110 may send the package 220 to the consumer 120, which redirects the package 220 to the tester 130. Alternatively, the producer 110 may send the package directly to the tester 130. In another example, the consumer 120 may send only the certificate 215 from the package 220 to be validated, without the actual software module 200. However, separating the certificate 215 from the software module 200 in the package 220 might create issues with mismatches between the certificate being validated by the tester 130 and the software module to be implemented by the consumer 120. The tester 130 verifies that the certificate 215 is present in the package, that the certificate 215 is valid and decodes correctly, that the all of the custom fields are present in the certificate 215, and that all the attributes pass the criteria set by the consumer 120. If the certificate 215 does not pass any of the verification tests, the tester 130 may send a report 230 to the producer 110 with an indication of the issue found in the certificate 215. The producer 110 may then review the report 230 and determine one or more corrective actions before sending an updated package 220 to the tester 130. Once the certificate 215 passes the validation tests at the tester 130, the tester 130 may send the code module 200 to the consumer 120. Additionally, the tester 130 may perform additional automated testing, such as integration testing, before or after the code module 200 is returned to the consumer 120. After the code module 200 is fully validated and succeeds in passing any additional testing (e.g., integration testing), the consumer 120 may integrate the code module into the production environment 124 as a product or service.

In one example, the code module 200 may be a component of a CNF/VNF produced by the producer 110. The CSR 210 from the producer 110 may request a certificate 215 that includes attributes such as an identification as a CNF/VNF component, a Center for Internet Security (CIS) security benchmark, a quality metric, a specific testing environment, and a release date, as well as information identifying the producer 110. If the values of the attributes do not meet predetermined criteria set by the consumer 120, then the consumer 120 may refuse to issue the certificate 215.

In another example, the certificate 215 provides a structure of attributes, which may be given to the producer 110, as part of the consumer 120 self-signing the certificate 215. The certificate 215 may be formatted according to a Secure Sockets Layer (SSL) format, with the structure of attributes provided in an extension field, such as defined in version 3 of the X.509 standard (X.509v3). To ensure that all of the attributes are present, the extension field for the attributes may be designated as a critical extension field as defined in the X.509v3 standard. Alternatively, other formats and standards for digital certificates may be used to convey the structure of attributes of a software module. The tester 130 has privileges to validate/accept the SSL certificate, or take other actions on the certificate, including rejecting the certificate. By having the producer 110 request a specific module certificate with specific attribute requirements for the software module, liability for the quality of the software module potentially causing a negative business impact is moved from the consumer 120 to the producer 110 of the software module. In other words, rather than the consumer 120 relying on their resources to verify the quality of the software module, the producer 110 must use their resources to ensure that the software module meets the specific attributes requested in the certificate 215.

Figure 3:
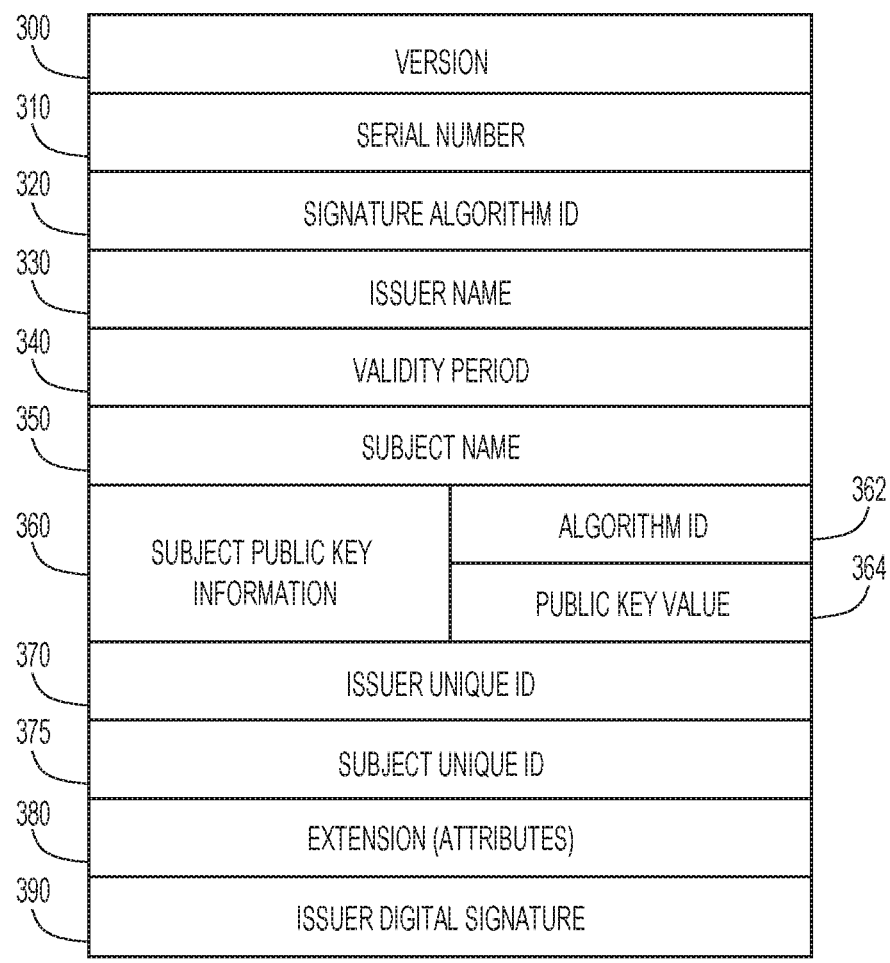
FIG. 3 illustrates a digital certificate with an extension field used to automatically validate a software module, according to an example embodiment.

Referring now to FIG. 3, an example of the certificate 215 formatted according to the X.509v3 standard is shown. In this example, the certificate 215 includes a version 300 (i.e., version 3) to which the certificate 215 conforms. A serial number 310 uniquely identifies the certificate 215. The names of the public key algorithms (e.g., Rivest-Shamir-Adleman (RSA) with Secure Hash Algorithm (SHA) 1) that the Certificate Authority (CA), e.g., the consumer 120, has used to sign the certificate 215 is stored in the signature algorithm identifier 320. The issuer name 330 stores the name of the CA (e.g., the consumer 120) that issued the certificate 215. In one example, the issuer name 330 may be stored according to an X.500 format. The certificate 215 also includes a validity period 340, which may be indicated with a start date and an expiration date.

The identity of the owner of the certificate 215 (e.g., the producer 110) is stored in the subject name 350. In one example, the subject name 350 may be stored according to an X.500 format. The subject public key information 360 includes an algorithm identifier 362 and a public key value 364 of the owner of the certificate (e.g., the producer 110). The certificate 215 includes an issuer unique identifier 370 to uniquely identify the issuer (e.g., the consumer 120) of the certificate 215. The certificate also includes a subject unique identifier 375 to uniquely identify the owner (e.g., the producer 110) of the certificate 215.

The certificate 215 includes an extension field 380 that stores the attributes of the software module produced by the producer 110 for the consumer 120. The attributes stored in the extension field 380 of the certificate 215 are used by the tester 130 to validate the software module that is packaged with the certificate 215. The extension field 380 may also include other information, such as alternate names for the owner of the certificate 215, a Certificate Revocation List (CRL) distribution point, and/or certificate policies. The certificate 215 also includes the digital signature 390 of the CA (e.g., the consumer 120) issuing the certificate 215. The techniques described herein leverage the X.509v3 extension field to provide a standardized way of providing the attributes of a software code module in an authenticated form.

To validate a software module produced for a 5G Service Provider as the consumer 120, the certificate 215 may include the attributes in Table 1 as an example.

TABLE 1

Attributes and Acceptable Limits

| Attribute | Value (minimum) | Value (maximum) |
|---|---|---|
| Quality metric | 4 | 10 |
| Security Benchmark (e.g., CIS) | 85 | 103 |
| Test Environment | Lab/Production | Lab/Production |
| Version | x.y.z | a.b.c |
| Producer Name | Text (32 character) | Text (256 Character) |
| Producer ID | Number (32 bit) | Number (64 bit) |
| Module Type | VNF, CNF | VNF, CNF |
| Release Type | Patch, Minor, Major, Critical | Patch, Minor, Major, Critical |
| Release Date | Current year start date | 7 days from system date |

Figure 4:
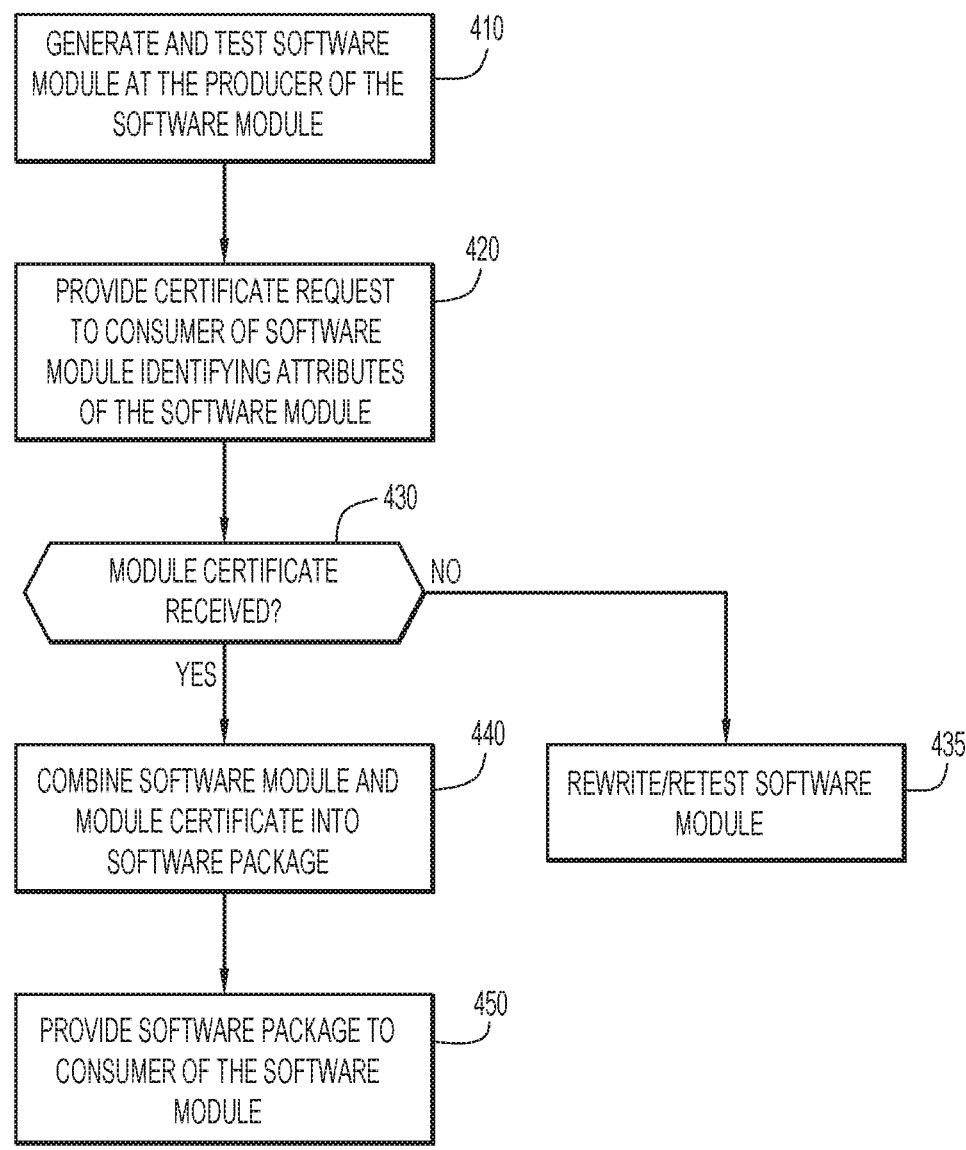
FIG. 4 is a flowchart illustrating operations performed at a producer of a software module to enable automatic validation of the software module, according to an example embodiment.

Referring now to FIG. 4, a flowchart illustrating operations performed by a producer (e.g., producer 110) of software code modules in a process 400 for allowing the software modules to be automatically validated. At 410, the producer generates and tests the software module. In one example, the producer may perform multiple types of testing (e.g., unit testing, feature testing, functionality testing, scalability testing, security testing, penetration testing, performance testing, etc.) and/or multiple iterations of testing (e.g., after mitigating issues found in earlier iterations of testing) before releasing the software module. When the producer is ready to release the software module to the consumer of the software module, at 420, the producer provides a certificate request to the consumer identifying attributes of the software module. In one example, the attributes may describe the testing regimen performed by the producer, e.g., through a quality metric, performance benchmark, or security benchmark.

If the producer does not receive a module certificate, as determined at 430, then the producer may rewrite the software module and/or retest the code module at 435. In one example, the consumer may reject the certificate request and provide feedback to the producer as to why the consumer rejected the certificate request. The producer may use the feedback to refine the software module and/or refine the testing procedure for the software module. In another example, the consumer may issue certificates with any values for the attributes, and rely on a testing entity to reject certificates/software modules with attribute values that are not within predetermined limits.

If the producer receives a module certificate at 430 in response to the certificate request, then the producer groups the software module and the certificate request into a software package at 440. In one example, the certificate received from the consumer includes indications of at least some of the attributes of the software module. The producer provides the software package comprising the software module and the module certificate to the consumer at 450, enabling the consumer or an independent third party to validate the software module with the module certificate.

Figure 5:
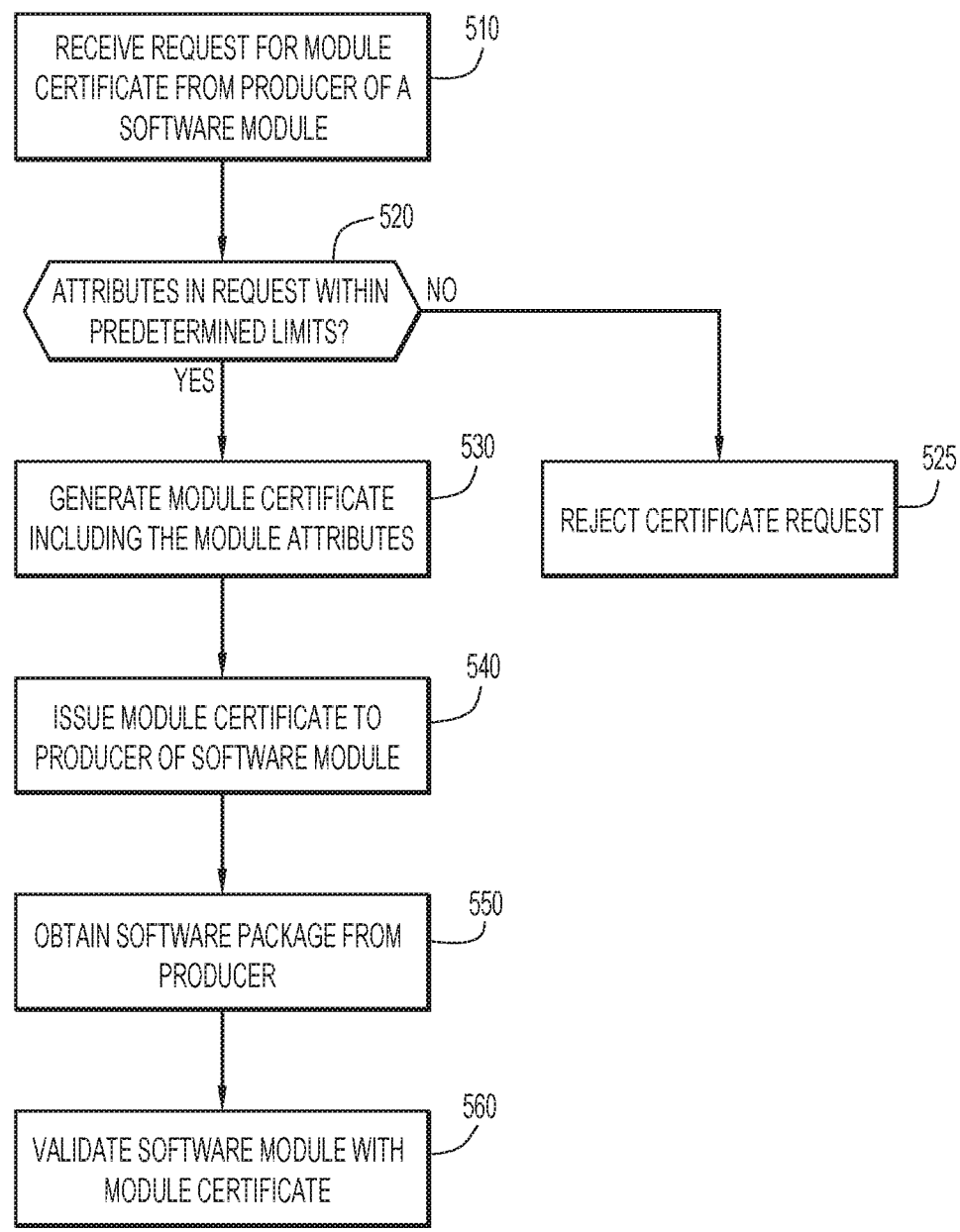
FIG. 5 is a flowchart illustrating operations performed at a consumer of a software module to enable automatic validation of the software module, according to an example embodiment.

Referring now to FIG. 5, a flowchart illustrates operations performed by a consumer of a software module (e.g., consumer 120) in a process 500 for issuing a module certificate that enables a software module from a software producer to be automatically validated. At 510, the consumer receives a request for a module certificate from a producer of a software module. In one example, the request indicates attributes, such as the type of software module, an indication of a testing environment, a quality metric, or a security benchmark, related to the software module. At 520, the consumer determines whether the attributes in the certificate request are within predetermined limits. If the attributes are not within predetermined limits, then the consumer rejects the certificate request at 525. In one example, the consumer may provide feedback as to why the certificate request was rejected, such as which attribute did not conform to the predetermined limits.

If the attributes in the certificate request are within the predetermined limits, as determined at 520, then the consumer generates a module certificate signed by the consumer of the software module at 530. In one example, the module certificate is formatted in a standard format, e.g., an X.509v3 format. In another example, the module certificate includes the attributes of the software module, e.g., in an extension field of the certificate. At 540, the consumer issues the module certificate to the producer. At 550, the consumer obtains a software package from the producer of the software module. The software package includes the software module and the module certificate.

At 560, the consumer validates the software module form the software package using the module certificate. In one example, the consumer may direct an independent third party to be the testing entity for the software module. Alternatively, the testing entity may be a part of the consumer.

Figure 6:
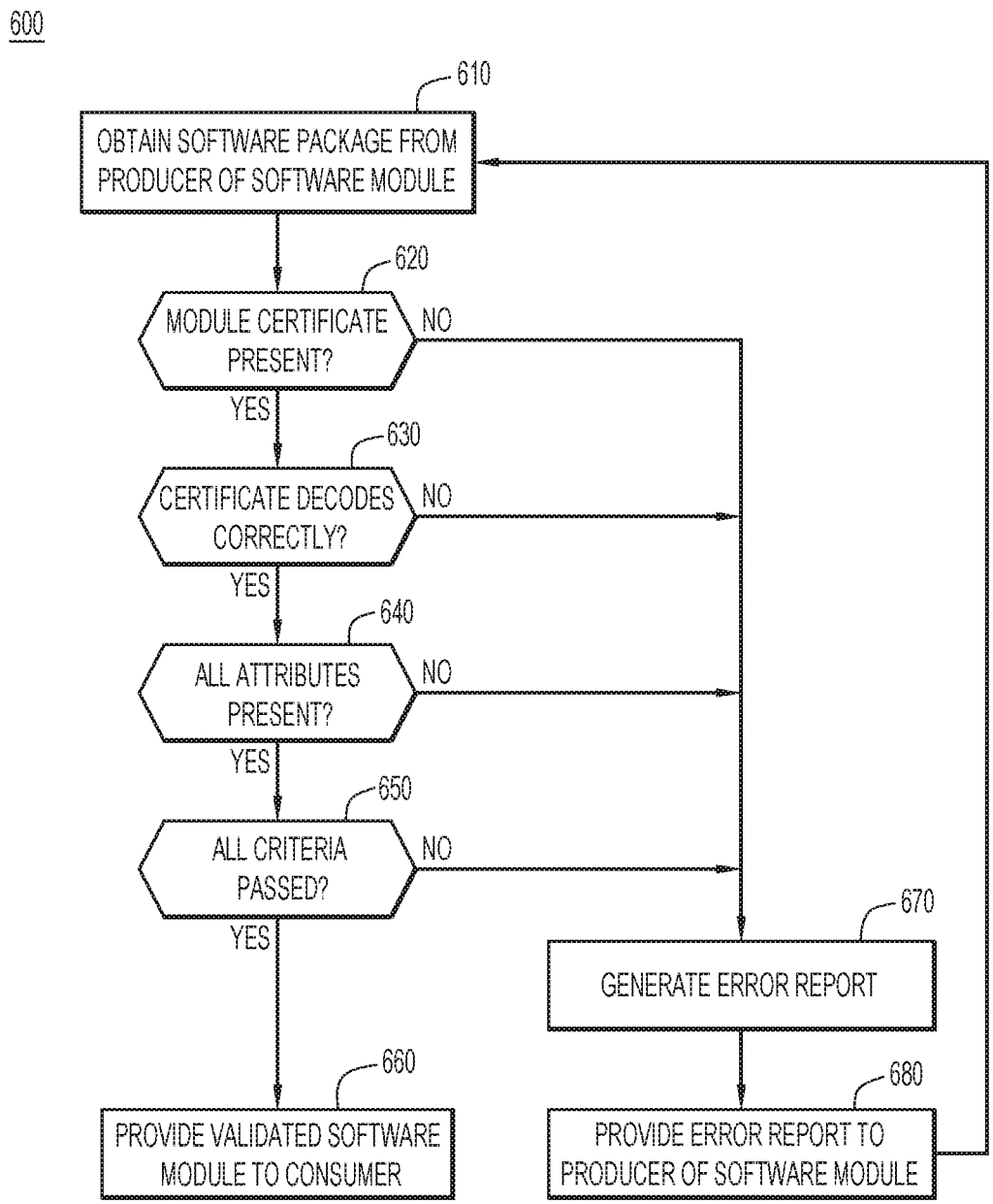
FIG. 6 is a flowchart illustrating operations performed at a tester of a software module to enable automatic validation of the software module, according to an example embodiment.

Referring now to FIG. 6, a flowchart illustrates operations performed by a testing entity (e.g., tester 130) in a process 600 for validating a software module from a producer (e.g., producer 110) with a module certificate issued by a consumer (e.g., consumer 120). At 610, the testing entity obtains a software package including a software module from a producer of a software module. In one example, the consumer of the software module has directed the testing entity to validate the software package. To validate the software package, the testing entity determines if there is a module certificate present in the software package at 620. If there is a module certificate present, the testing entity determines if the module certificate is valid and decodes correctly at 630. If the module certificate is present, valid, and decodable, the testing entity determines if all of the expected attributes are present in the module certificate at 640. If all the attributes are present, the testing entity determines if the predetermined criteria for each attribute is met at 650.

If the software package passes all of the tests at 620, 630, 640, and 650, then the testing entity validates the software module from the software package, and provides the validated software module to the consumer at 660. In one example, the testing entity may provide further testing (e.g., integration testing) on the software module before providing the software module to the consumer. In another example, the testing entity notifies the consumer that the software module is validated without needing to send the entire software module to the consumer.

If the software package fails at least one of the tests at 620, 630, 640, or 650, then the testing entity generates an error report at 670. The error report may identify the failed test, and may provide further information about why the module certificate of the software package failed the validation test. For instance, the testing entity may provide information on which attribute is missing from the test at 640 or which attribute failed to meet the predetermined limits at 650. The testing entity provides the error report to the producer of the software module at 680, which allows the producer to mitigate the failure in the software package and provide an updated software package.

Figure 7:
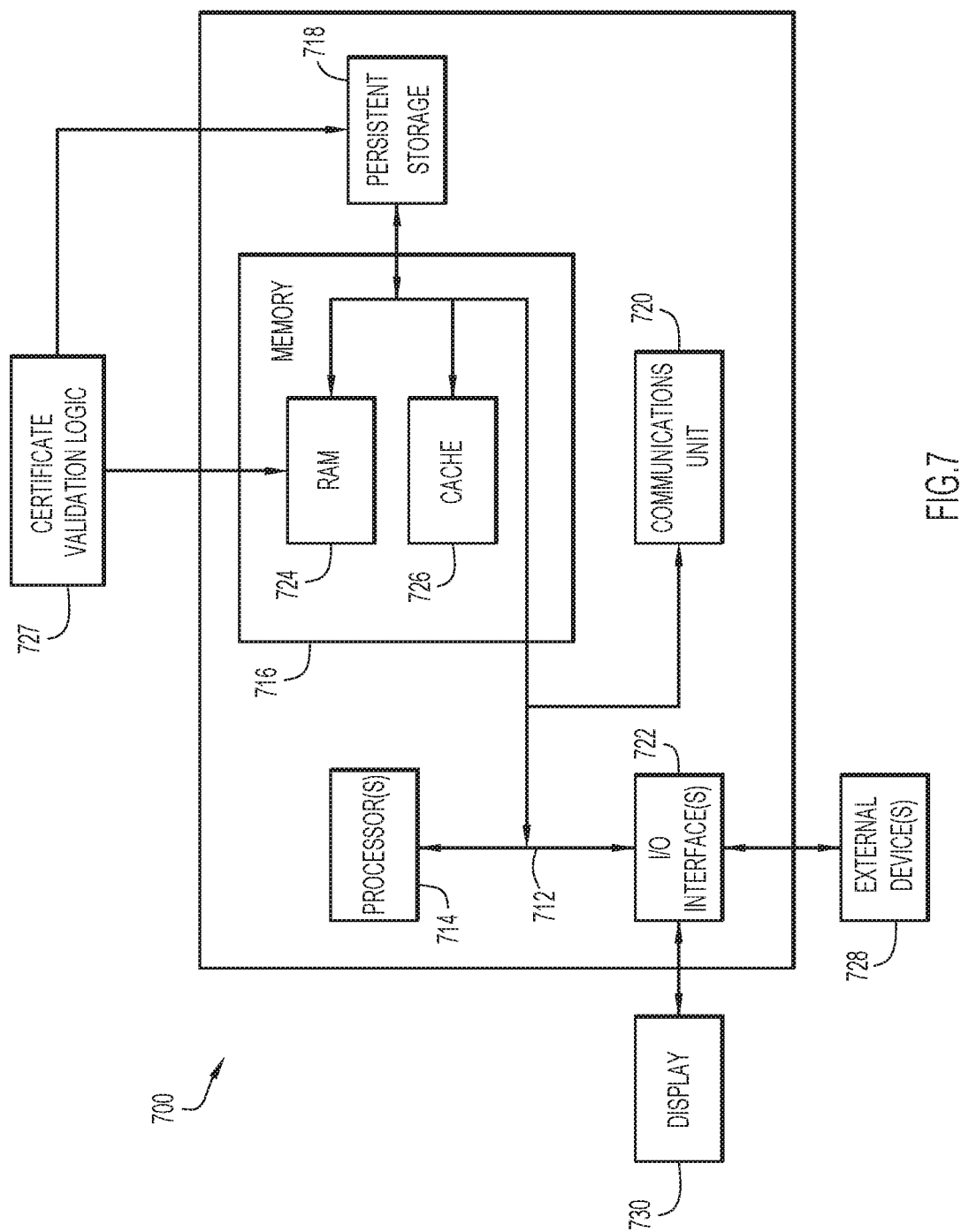
FIG. 7 illustrates a simplified block diagram of a device that may be configured to perform the methods presented herein, according to an example embodiment.

Referring now to FIG. 7, a hardware block diagram illustrates a computing device 700 that may perform the functions of any of the servers or computing or control entities (e.g., producer 110, consumer 120, or tester 130) referred to herein in connection with the software code module validation system described herein. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and Input/Output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for certificate validation logic 727 (e.g., module production logic 112, module certificate logic 122, or module validation logic 132) may be stored in memory 716 or persistent storage 718 for execution by processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices (e.g., producer 110, consumer 120, tester 130, etc.). In these examples, communications unit 720 includes one or more network interface units, such as network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

In various embodiments, certificate validation logic 727 can include instructions that, when executed, cause processor(s) 714 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., certificate validation logic 727) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) and/or storage can store data, software, code, instructions (e.g., processor instructions), logic, parameters, combinations thereof, and/or the like used for operations described herein. This includes memory elements and/or storage being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein enables consumers to receive validated software modules (e.g., CNF/VNF components) from approved vendors. The validation system presented herein automates the validation process, mitigating the time and expense of manually validating multiple releases from multiple producers. In one example, the validation system extends features of a standardized digital certificate (e.g., X.509) for the automated validation of custom software features and release from any producer. Automated validation reduces the time to market of features, such as 5G features for mobile users, which promotes the growth of users for 5G Service Providers, i.e., the consumers of the software modules.

The techniques presented herein assign attributes/values to improve software quality and reliability between producers and consumers. Replacing manual validation by consumers of multiple software module releases with automated validation reduces the consumer's risk, resource usage, and investment. The automated system described herein reduce the time required for validating software module from days to seconds. Additionally, an automated scoring system may enable the consumer to track the reliability and trustworthiness of various producers by determining which producers regularly request certificates with high standards and meet those standards.

In one form, a method is provided to issue a module certificate that enables a testing entity to automatically validate a software module from a producer. The method includes receiving at a consumer of the software module, a request for a module certificate from the producer of the software module. The request indicates attributes of the software module. The method also includes determining whether the attributes of the software module are within predetermined limits. If the attributes are within predetermined limits, the method includes generating the module certificate signed by the consumer of the software module. The module certificate includes the attributes of the software module. The method further includes issuing the module certificate to the producer of the software module. The method also includes obtaining a software package from the producer. The software package includes the software module and the module certificate. The method includes validating the software module with the module certificate.

In another form, an apparatus comprising a network interface and a processor is provided. The network interface is configured to communicate with a plurality of computing devices. The processor is coupled to the network interface, and configured to receive via the network interface, a request for a module certificate from a producer of a software module. The request indicates attributes of the software module. The processor is also configured to determine whether the attributes of the software module are within predetermined limits. Response to determining that the attributes of the software module are within the predetermined limits, the processor is configured to generate the module certificate signed by the consumer of the software module. The module certificate includes the attributes of the software module. The processor is further configured to issue the module certificate via the network interface to the producer of the software module. The processor is also configured to obtain a software package from the producer via the network interface. The software package includes the software module and the module certificate. The processor is configured to validate the software module with the module certificate.

In still another form, a non-transitory computer readable storage media is provided that is encoded with instructions that, when executed by a processor of a computing device at a consumer of a software module, cause the processor to receive a request for a module certificate from a producer of the software module. The request indicates attributes of the software module. The instructions also cause the processor to determine whether the attributes of the software module are within predetermined limits. Responsive to a determination that the attributes in the request are within the predetermined limits, the instructions cause the processor to generate the module certificate signed by the consumer of the software module. The module certificate includes the attributes of the software module. The instructions further cause the processor to issue the module certificate to the producer of the software module. The instructions also cause the processor to obtain a software package from the producer. The software package includes the software module and the module certificate. The instructions cause the processor to validate the software module with the module certificate.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

receiving at a consumer of a software module, a request for a first module certificate from a producer of the software module, the request indicating attributes that describe and characterize the software module;

determining whether the attributes of the software module are within predetermined limits for operation by the consumer of the software module;

responsive to a determination that the attributes in the request are within the predetermined limits, generating the first module certificate signed by the consumer of the software module, the first module certificate including the attributes of the software module;

issuing the first module certificate to the producer of the software module;

obtaining a software package at the consumer of the software module from the producer of the software module, the software package comprising the software module and a second module certificate;

determining whether the second module certificate is validly signed by the consumer of the software module;

decoding the second module certificate to generate a decoded second module certificate;

determining from the decoded second module certificate whether the second module certificate includes all of the attributes present in the first module certificate; and responsive to a determination that the second module certificate is present in the software package, is validly signed by the consumer of the software module, and includes all of the attributes present in the first module certificate, validating the software module from the software package.

2. The method of claim 1, wherein the software module is a component of either a Cloud Native Function (CNF) or a Virtual Network Function (VNF).

3. The method of claim 1, wherein the attributes of the software module include a quality metric, a security benchmark, an indication of a testing environment, a release date of the software module, an indication of a type of software module, a version indication of the software module, a name of the producer of the software module, or an identifier of the producer of the software module.

4. The method of claim 1, wherein the first module certificate and the second module certificate are formatted as Secure Sockets Layer (SSL) certificates.

5. The method of claim 4, wherein the attributes of the software module are included in a critical extension of the SSL certificates.

6. The method of claim 1, further comprising performing one or more integration tests of the software module in a production environment of the consumer of the software module.

7. The method of claim 6, further comprising, responsive to the one or more integration tests succeeding, implementing the software module into a product supplied by the consumer of the software module.

8. An apparatus comprising:

a network interface configured to communicate with a plurality of computing devices; and a processor coupled to the network interface, the processor configured to:

receive via the network interface, a request for a first module certificate from a producer of a software module, the request indicating attributes that describe and characterize the software module;

determine whether the attributes of the software module are within predetermined limits for operation by a consumer of the software module;

responsive to a determination that the attributes in the request are within the predetermined limits, generate the first module certificate signed by a consumer of the software module, the first module certificate including the attributes of the software module;

issue the first module certificate via the network interface to the producer of the software module;

obtain a software package at the consumer of the software module from the producer of the software module via the network interface, the software package comprising the software module and a second module certificate;

decode the second module certificate to generate a decoded second module certificate;

determine from the decoded second module certificate whether the second module certificate includes all of the attributes present in the first module certificate; and responsive to a determination that the second module certificate is present in the software package, is validly signed by the consumer of the software module, and includes all of the attributes present in the first module certificate, validate the software module from the software package.

9. The apparatus of claim 8, wherein the software module is a component of either a Cloud Native Function (CNF) or a Virtual Network Function (VNF).

10. The apparatus of claim 8, wherein the attributes of the software module include a quality metric, a security benchmark, an indication of a testing environment, a release date of the software module, an indication of a type of software module, a version indication of the software module, a name of the producer of the software module, or an identifier of the producer of the software module.

11. The apparatus of claim 8, wherein the processor is configured to format the first module certificate as a Secure Sockets Layer (SSL) certificate.

12. The apparatus of claim 11, wherein the attributes of the software module are included in a critical extension of the SSL certificate.

13. The apparatus of claim 8, wherein the processor is further configured to:

obtain the software module from a testing entity after the software module has been validated; and perform one or more integration tests of the software module in a production environment of the consumer of the software module.

14. The apparatus of claim 13, wherein the processor is further configured to, responsive to the one or more integration tests succeeding, implement the software module into a product supplied by the consumer of the software module.

15. One or more non-transitory computer readable storage media encoded with computer executable instructions to cause a processor in a consumer of computing device of a consumer of a software module to:
> receive a request for a first module certificate from a producer of the software module, the request indicating attributes that describe and characterize the software module;
> determine whether the attributes of the software module are within predetermined limits for operation by the consumer of the software module;
> responsive to a determination that the attributes in the request are within the predetermined limits, generate the first module certificate signed by the consumer of the software module, the first module certificate including the attributes of the software module;
> issue the first module certificate to the producer of the software module;
> obtain a software package at the consumer of the software module from the producer of the software module, the software package comprising the software module and a second module certificate;
> determine whether the second module certificate is validly signed by the consumer of the software module;
> decode the second module certificate to generate a decoded second module certificate;
> determine from the decoded second module certificate whether the second module certificate includes all of the attributes present in the first module certificate; and
> responsive to a determination that the second module certificate is present in the software package, is validly signed by the consumer of the software module, and includes all of the attributes present in the first module certificate, validate the software module from the software package.

16. The non-transitory computer readable storage media of claim 15, wherein the attributes of the software module include a quality metric, a security benchmark, an indication of a testing environment, a release date of the software module, an indication of a type of software module, a version indication of the software module, a name of the producer of the software module, or an identifier of the producer of the software module.

17. The non-transitory computer readable storage media of claim 15, further comprising instructions operable to cause the processor to format the first module certificate as a Secure Sockets Layer (SSL) certificate.

18. The non-transitory computer readable storage media of claim 17, further comprising instructions operable to cause the processor to include the attributes of the software module in a critical extension of the SSL certificate.

19. The non-transitory computer readable storage media of claim 15, further comprising instructions operable to cause the processor to:
> obtain the software module from a testing entity after the software module has been validated; and
> perform one or more integration tests of the software module in a production environment of the consumer of the software module.

20. The non-transitory computer readable storage media of claim 19, further comprising instructions operable to cause the processor to, responsive to the one or more integration tests succeeding, implement the software module into a product supplied by the consumer of the software module.

* * * * *